(12) United States Patent
Sugawara et al.

(10) Patent No.: US 7,936,991 B2
(45) Date of Patent: May 3, 2011

(54) OPTICAL LINE TERMINATING APPARATUS AND OPTICAL COMMUNICATION SYSTEM

(75) Inventors: Toshiki Sugawara, Kokubunji (JP); Masahiko Mizutani, Yokohama (JP); Hiroki Ikeda, Hachioji (JP); Kenichi Sakamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 650 days.

(21) Appl. No.: 12/068,829

(22) Filed: Feb. 12, 2008

(65) Prior Publication Data

US 2009/0080888 A1 Mar. 26, 2009

(30) Foreign Application Priority Data

Sep. 25, 2007 (JP) ................................. 2007-246485

(51) Int. Cl.
*H04B 10/20* (2006.01)
*H04J 14/00* (2006.01)

(52) U.S. Cl. ............... 398/67; 398/58; 398/63; 398/68; 398/72

(58) Field of Classification Search .................... 398/58, 398/61–64, 66–72
See application file for complete search history.

(56) References Cited

U.S. PATENT DOCUMENTS

| | | | |
|---|---|---|---|
| 2007/0064731 A1 | 3/2007 | Mizutani et al. | |
| 2008/0050116 A1* | 2/2008 | Nakaishi et al. | 398/43 |
| 2009/0010650 A1* | 1/2009 | Tsuchiya et al. | 398/59 |
| 2009/0190931 A1 | 7/2009 | Hamano et al. | |
| 2010/0119240 A1* | 5/2010 | Feng | 398/202 |

FOREIGN PATENT DOCUMENTS

| | | |
|---|---|---|
| JP | 2007-74234 | 9/2005 |
| JP | 2005-333318 | 12/2005 |
| JP | 2006-345284 | 12/2006 |
| JP | 2007-243796 | 9/2007 |
| WO | WO 2008/068811 | 6/2008 |

OTHER PUBLICATIONS

"Physical Medium Dependent (PMD) Sublayer and Medium, Type 1000BASE-PX10 and 1000BASE-PX20 (long wavelength passive optical networks)", Revision of IEEE Std. 802-3-2005, pp. 121-148.
"Gigabit-Capable Passive Optical Networks (GPON): General Characteristics", ITU-T, G.984.1 (Mar. 2003), Series G: Transmission Systems and Media, Digital System and Networks, pp. i-iii and 1-14.

(Continued)

*Primary Examiner* — Dalzid Singh
(74) *Attorney, Agent, or Firm* — Stites & Harbison PLLC; Juan Carlos A. Marquez, Esq (57) ABSTRACT

An optical access communication apparatus and an optical access communication system for the coexistence of two wideband PON systems without using an expensive optical device or module. A low-speed PON and a high-speed PON have a same upstream wavelength, and an OLT receives optical signals by a same optical receiver in the two systems, converts the optical signals into electric signals, amplifies the electric signals, branches the amplified electric signals, and processes the branched signals by clock and data recovery sections of bit rates corresponding to the two PON systems, thereby achieving an optical communication apparatus and an optical communication system for constructing a simple and low-cost triple-play service system of excellent transmission quality.

16 Claims, 5 Drawing Sheets

OTHER PUBLICATIONS

"Gigabit-Capable Passive Optical Networks (GPON): Physical Media Dependent (PMD) Layer Specification", ITU-T, G.984.2 (Mar. 2003), Series G: Transmission Systems and Media, Digital System and Networks, pp. i-iii and 1-29, and Amendment 1, pp. i-iv and 1-3.

"Gigabit-Capable Passive Optical Networks (GPON): Transmission Convergence Layer Specification", ITU-T, G.984.3 (Feb. 2004), Series G: Transmission Systems and Media, Digital System and Networks, pp. i-iv and 1-107, and Amendment 1, pp. i-iv and 1-38, and Amendment 2, pp. i-iii and 1-5, and Amendment 3, pp. i-iii and 1-4.

* cited by examiner

OPTICAL LINE TERMINATING APPARATUS AND OPTICAL COMMUNICATION SYSTEM

CLAIM OF PRIORITY

The present application claims priority from Japanese application JP 2007-246485 filed on Sep. 25, 2007, the content of which is hereby incorporated by reference into this application.

FIELD OF THE INVENTION

The present invention relates to an optical access communication apparatus and an optical access communication system for use in a passive optical network (PON) using time division multiple access (TDMA) and wavelength division multiple access (WDMA) in signal multiplexing techniques for constructing an optical access network.

BACKGROUND OF THE INVENTION

Services on a communication network have become increasingly diversified, and new services taking advantage of the network have been expanding. A representative example thereof is the integration of broadcasting and communication services such as so-called triple-play service for integrating broadcasting, Internet, and telephone (audio communication) services. To achieve the triple-play service, FTTH (Fiber To The Home) construction with PON is becoming mainstream in an access network. In this PON system, plural subscribers share an optical fiber from a subscriber accommodation office to an optical splitter and facilities in the office, which leads to cost sharing for reductions in initial introduction cost and maintenance cost. In the PON-based FTTH system which is a shared-media network described above, a bandwidth available to a subscriber is roughly equal to a value obtained by dividing the maximum throughput of the system by the number of sharing subscribers. However, due to a low probability of simultaneous access by all subscribers, the subscriber can practically use a greater bandwidth by statistical multiplexing effect. With such a PON-based wideband FTTH system, it is possible to achieve comfortable triple-play service. Current systems include ITU-T G-PON and IEEE GE-PON. Details of G-PON are defined, for example, in ITU-T G.984.1 "Gigabit-capable Passive Optical Networks (GPON): General characteristics", ITU-T G.984.2 "Gigabit-capable Passive Optical Networks (GPON): Physical Media Dependent (PMD) layer specification", and ITU-T G.984.3 "Gigabit-capable Passive Optical Networks (GPON): Transmission convergence layer specification", and details of GE-PON are defined in IEEE 802.3ah "CSMA/CD Access Method and Physical Layer Specifications Amendment: Media Access Control Parameters, Physical Layers, and Management Parameters for Subscriber Access Networks." For example, in the G-PON system, an optical line terminating apparatus (OLT) accommodates up to 64 optical network terminating units (ONUs) through a 2.4-Gbps high-speed optical line. Collision avoidance control is one of the schemes of sharing facilities in the office as described above. Optical signals (upstream signals) are outputted from ONUs to the OLT, with the optical signal powers being mutually superposed by an optical splitter. In order for the OLT to receive plural separate signals, there is performed transmission timing control such that the signals from the ONUs arrive at the OLT at different times without being mutually superposed, that is, collision avoidance control. Currently, standardizing organizations (ITU-T and IEEE) have started to study next-generation PONs subsequent to these current PON systems. For a wider band of the PON system, studies are being conducted on a higher speed of TDMA applied to the current PON, an increase in bit rate, and the like.

The wavelength multiplexing transmission technique is applied to the triple-play service in the PON system. A wavelength range of 1550 to 1560 nm is allocated to a video transmission system. In the PON system, 1490 nm band data signal light is allocated to downstream optical signals from the OLT to the ONU, and 1300 nm band data signal light is allocated to upstream optical signals from the ONU to the OLT. It is desirable that a next-generation PON targeted at a communication speed of 10 Gbps share a fiber with the existing GE-PON and G-PON systems for system construction.

However, in an optical transmission system having a bit rate of 10 Gbps, a phenomenon called the wavelength dispersion of an optical fiber greatly limits transmission speed and transmission distance. The wavelength dispersion is a phenomenon in which beams having different wavelengths propagate at different speeds in the optical fiber. Since the optical spectrum of an optical signal modulated at high speed includes different wavelength components, these components arrive at a receiver at different times due to the effect of the wavelength dispersion when propagating through the optical fiber. This causes distortion in optical signal waveform after fiber transmission. There is a technique called dispersion compensation to suppress the waveform degradation due to the dispersion. The dispersion compensation is a technique in which an optical element having a wavelength dispersion characteristic inverse to that of an optical fiber used as a transmission line is disposed in an optical transmitter, a receiver, or a repeater so as to cancel the wavelength dispersion characteristic of the optical fiber to prevent the waveform degradation. As this optical element, that is, a dispersion compensator, devices having an inverse dispersion characteristic such as a dispersion compensation fiber and an optical fiber grating have been studied and put to practical use. However, the dispersion compensator is expensive and not practical for the PON system. As a method not using the dispersion compensator, there is a method of using a low-chirp external modulator. The chirp is a minute and dynamic wavelength variation which occurs when an optical carrier emitted from a communication laser is modulated in an optical communication system. The chirp causes group delay according to a wavelength dispersion value of the optical transmission line, thus distorting an optical signal pulse waveform and degrading transmission quality. For a wavelength of 1490 nm or greater used in the PON system, in the case of directly modulating a laser, it is difficult to achieve a transmission distance of 20 km under the influence of the chirp and the dispersion. In this case, it is considered that a method of using EA (Electro-Absorption) modulator with the electroabsorption effect of a semiconductor is favorable. This is because, EA is made of semiconductor material, which facilitates the integration of the external modulator and the laser, thereby making it possible to suppress a cost increase compared to a modulator using optical crystal having electrooptic effect such as $LiNbO_3$. Compared to the method of directly modulating a laser, the use of the EA modulator causes a cost increase corresponding to the modulator. However, in the PON system, plural subscribers share facilities in the office for cost sharing; therefore, in the case where the modulator is used in the optical line terminating apparatus, this cost increase is not a fatal problem.

SUMMARY OF THE INVENTION

However, when such an external modulator is used in an optical network terminating unit, due to inability to share the cost, even a small cost increase becomes a problem. Accordingly, it can be considered that the method of directly modulating a laser without using the external modulator is favorable to a transmitter for transmitting an optical signal (upstream signal) from the ONU to the OLT. However, in the current PON system, the 1300 nm band for enabling 20 km transmission by a direct modulator is already used for upstream signals. Accordingly, for the coexistence of the next-generation PON targeted at a communication speed of 10 Gbps with the current PON system, it is selected whether a different wavelength is used or the same wavelength is used under the collision avoidance control. The use of a different wavelength requires the external modulator as described above, which causes a cost increase. In the case where the same wavelength is used under the collision avoidance control; for signal input to a current PON apparatus and a next-generation PON apparatus, there is a method of branching an optical signal by an optical splitter. However, in this method, each PON apparatus receives half the optical signal power, which causes a problem that a loss budget cannot be ensured, that is, transmission quality cannot be maintained due to degradation in the S/N ratio of the signal beam. Further, there is a method of using a device such as an optical amplifier to compensate the optical signal power, which however causes a problem of increasing system cost due to the introduction of the new device.

An optical line terminating apparatus according to the invention includes a fixed wavelength band optical receiver capable of receiving a signal of a wavelength, an electric signal amplifier, an electric signal branch section, and a first clock and data recovery section. The fixed wavelength band optical receiver receives optical signals having a same wavelength and mutually different bit rates from the first and second optical network terminating units and converts the optical signals into electric signals, the electric signal amplifier amplifies the electric signals, the electric signal branch section branches the amplified electric signals into a signal of the first optical network terminating unit and a signal of the second optical network terminating unit and the first clock and data recovery section extracts a first data signal and a first clock signal corresponding to a bit rate of the signal of the first optical network terminating unit from the branched signal of the first optical network terminating unit.

By using the optical communication apparatus and system according to the invention, it is possible to construct a simple and low-cost triple-play service system of excellent transmission quality.

DETAILED DESCRIPTION OF THE PREFERRED EMBODIMENTS

Figure 1:
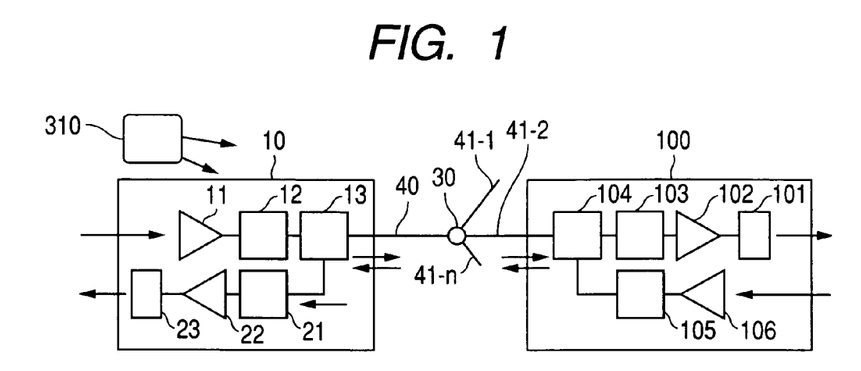
FIG. 1 is a diagram illustrating the basic configuration of a PON system according to an embodiment of the present invention.

Hereinafter, embodiments of the present invention will be described in detail with reference to the accompanying drawings. FIG. 1 shows the basic configuration of a PON system. In the PON system, an optical line terminating apparatus (OLT) transmitter-receiver 10 is connected to at least one optical network terminating unit (ONU) transmitter-receiver 100 through optical fibers 40 and 41 and an optical splitter 30. The optical line terminating apparatus transmitter-receiver 10 is composed of a driver amplifier 11, a modulation-capable light source 12, a WDM 13, an optical receiver 21, a transimpedance amplifier 22, and a clock and data recovery section 23. The optical network terminating unit transmitter-receiver 100 is composed of a driver amplifier 106, a modulation-capable light source 105, a WDM 104, an optical receiver 103, a transimpedance amplifier 102, and a clock and data recovery section 101.

Signal processing will be described according to signal flows. First, a description will be made of an optical signal (downstream signal) from the OLT to the ONU. A PON-frame-processed signal is processed by a SerDes (SERializer/DESerializer) circuit, and then inputted to the OLT transmitter-receiver 10. This electric signal is amplified by the driver amplifier 11 to obtain driving power enough for modulation by the modulation-capable light source 12. The amplified signal allows the modulation-capable light source 12 to output a modulated signal beam. If the bit rate falls within about 2.5 Gbps, the modulation-capable light source 12 can be achieved by the method of directly modulating a laser. In G-PON and GE-PON, a 1.49 µm wavelength band is used for the modulated signal beam, which is passed through the WDM 13 and then transmitted to an optical fiber 40. This optical signal is passed through the optical fiber 40, an optical splitter 30, and an optical fiber 41, and inputted to the ONU transmitter-receiver 100. In the ONU transmitter-receiver 100, after the 1.49 µm wavelength band component is separated by the WDM 104, the signal beam is inputted to the optical receiver 103. A photodiode (PD) is used as the optical receiver 103. More specifically, a PIN-type photodiode based on a PIN junction semiconductor is used, or an avalanche photodiode (APD) is used if sensitivity is required. A minute current change outputted from the photodiode is converted by the transimpedance amplifier 102 into a voltage change, which is amplified and then outputted. From the output signal, a clock signal and a data signal are extracted and outputted by the clock and data recovery section 101. The signal thus outputted from the ONU transmitter-receiver 100 is processed by a SerDes circuit, and is then PON-frame-processed.

Next, a description will be made of an optical signal (upstream signal) from the ONU to the OLT. A PON-frame-processed signal is processed by the SerDes circuit, and then inputted to the ONU transmitter-receiver 100. This electric signal is amplified by the driver amplifier 106 to obtain driving power enough for modulation by the modulation-capable light source 105. The amplified signal allows the modulation-capable light source 105 to output a modulated signal beam. If the bit rate falls within about 2.5 Gbps, the modulation-capable light source 105 can be achieved by the method of directly modulating a laser. In G-PON and GE-PON, a 1.3 µm wavelength band is used for the modulated signal beam, which is passed through the WDM 104 and then transmitted to the optical fiber 41. This optical signal is passed through the optical fiber 41, the optical splitter 30, and the optical fiber 40, and inputted to the OLT transmitter-receiver 10. In the OLT transmitter-receiver 10, after the 1.3 µm wavelength band component is separated by the WDM 13, the signal beam is inputted to the optical receiver 21. A photodiode (PD) is used as the optical receiver 21. More specifically, a PIN-type photodiode based on a PIN junction semiconductor is used, or an avalanche photodiode (APD) is used if sensitivity is required. A minute current change outputted from the photodiode is converted by the transimpedance amplifier 22 into a voltage change, which is amplified and then outputted. From the output signal, a clock signal and a data signal are extracted and outputted by the clock and data recovery section 23. The signal thus outputted from the OLT transmitter-receiver 10 is processed by the SerDes circuit, and is then PON-frame-processed.

Figure 2:
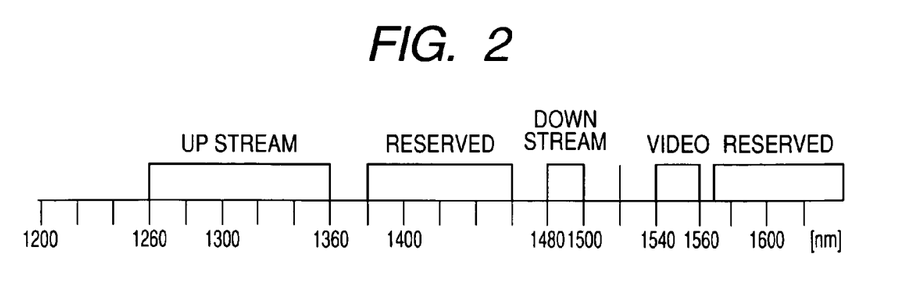
FIG. 2 is a diagram illustrating the arrangement of wavelengths used in the PON system.

The arrangement of wavelength bands used in the PON system will be described with reference to FIG. 2. In this example, a 1.49 µm wavelength band is used for a downstream signal and a 1.3 µm wavelength band is used for an upstream signal, thereby performing bidirectional signal transmission through one optical fiber. Further, an optical signal of a 1.55 µm wavelength band for video distribution may be multiplexed with a downstream signal. The 1.55 µm wavelength band can also be reserved for system upgrade. These wavelength-multiplexed optical signals are demultiplexed in an office or a user's home, so that a user can use plural services through the connection of only one optical fiber.

Figure 3:
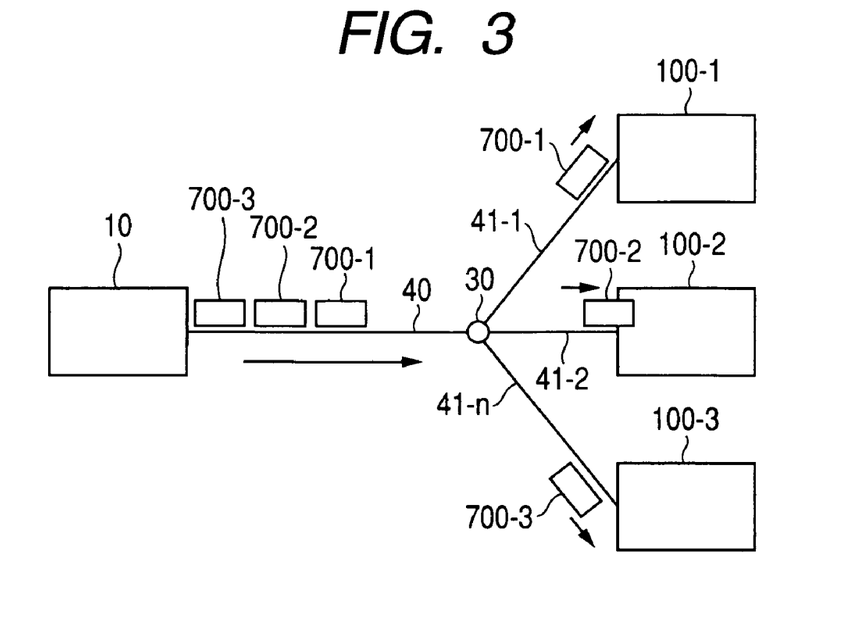
FIG. 3 is a diagram illustrating a method for specifying upstream signal transmission timing in the PON system.
Figure 4:
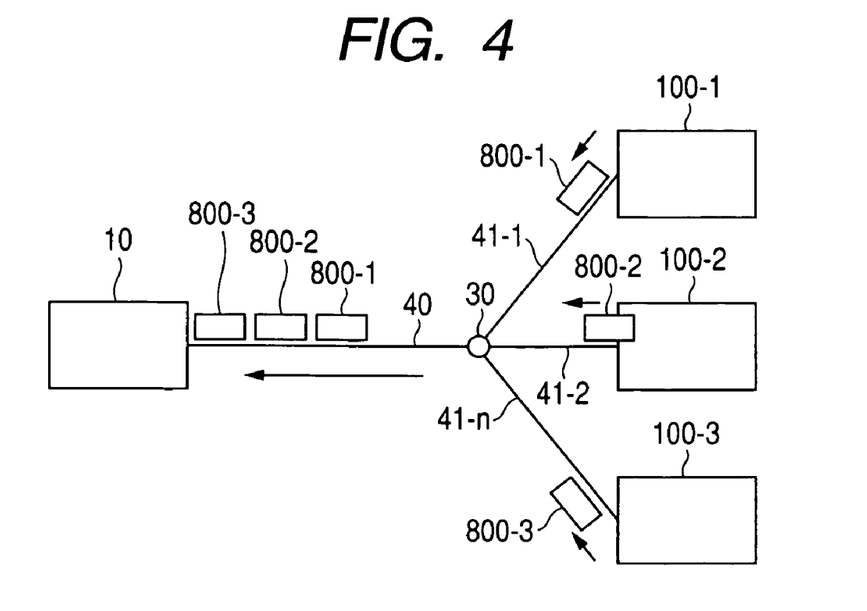
FIG. 4 is a diagram illustrating upstream signal collision avoidance in the PON system.
Figure 5:
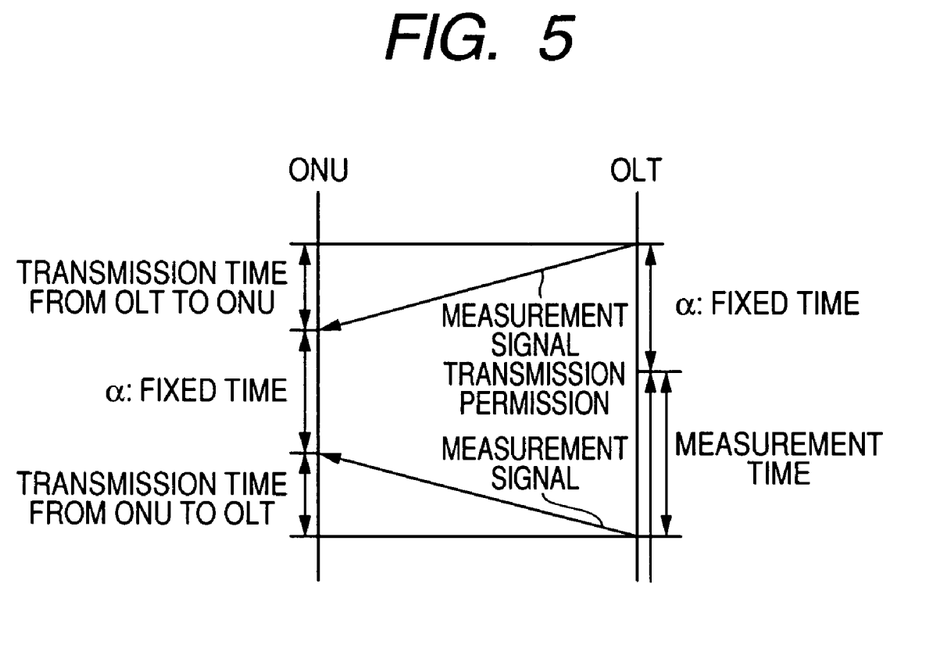
FIG. 5 is a diagram illustrating a time chart of ranging in the PON system.

In the PON system, all ONUs can receive a downstream signal outputted from the OLT, that is, the PON system has multicast capability. Thus, the OLT performs header writing for each packet or cell of the downstream signal, and each ONU receives only a signal addressed thereto. On the other hand, the technique of collision avoidance is applied to upstream signals, and a description thereof will be made with reference to FIGS. 3 and 4. FIG. 3 shows a method for specifying upstream signal transmission timing in the PON system. In the same manner as in FIG. 1, the OLT transmitter-receiver 10 is connected to the ONU transmitter-receivers 100 through the optical fiber 40, the optical splitter 30, and the optical fibers 41. The optical splitter 30 superposes optical signal powers for output. If upstream signals from the plurality of ONU transmitter-receivers 100 are simultaneously inputted to the optical splitter 30, these signals are mutually superposed and outputted to the OLT. The OLT cannot separate these signals, and therefore cannot receive them correctly. The ONUs need to control transmission timing so that the respective upstream signals arrive at the OLT at different times without being mutually superposed. For this reason, the OLT notifies each ONU of signal transmission permission to specify the transmission timing of each ONU, thereby making it possible to avoid a collision of upstream signals. In FIG. 3, gate timing instruction signals 700 instruct the respective ONUs about transmission timing. Further, as shown in FIG. 4, upstream signal cells or packets 800 are transmitted from the ONUs according to the timing provided from the OLT, which prevents a collision of upstream signals. In the PON system, the respective transmission distances between the OLT and the ONUs are not the same, and cannot be determined in advance. Accordingly, the OLT measures and stores beforehand the respective transmission times between the OLT and the ONUs, and thereby calculates timing that does not cause a collision of upstream signals from the ONUs and notifies it to the ONUs. The processing for measuring transmission times is referred to as ranging. FIG. 5 shows this ranging. First, after the OLT sends to an ONU an instruction (measurement signal transmission permission) to transmit a measurement signal after α seconds, the OLT sets a ranging window after α seconds. Then, the ONU transmits a measurement frame α seconds after receiving the instruction. The OLT measures a measurement time from the start of the ranging window to the arrival of the measurement signal from the ONU, and recognizes half the measurement time as a direction transmission time. In the ranging, the OLT inhibits signal transmission by ONUs other than a specific ONU only during a certain time called the ranging window. The OLT transmits and receives the measurement signal to and from the specific ONU in the ranging window, and calculates the transmission time between the OLT and the ONU based on a time of arrival. Since the OLT cannot receive in the ranging window a measurement signal from an ONU having a transmission time greater than the ranging window, the size of the ranging window determines the maximum distance between the OLT and the ONU in the PON system. This distance is referred to as a maximum logical distance, and defined separately from a physical distance determined by the transmission/reception level of an optical signal and a transmission line loss.

In the PON system, since a downstream signal is transmitted as one continuous signal obtained by concatenating packets or cells, the ONU receiver is not particularly different from that of a conventional optical transmission system. However, upstream signals received by the OLT become a burst state due to different clock phases and light intensities of individual ONUs; accordingly, the OLT needs a dedicated burst signal receiving circuit. In burst signal reception, it is necessary to eliminate the effect of an immediately preceding received signal. Further, it is necessary to extract signal timing from the overhead of a packet or cell to establish bit synchronization. Further, the PON system is required to effectively utilize bandwidths by best effort. The OLT can detect the traffic of a downstream signal addressed to each ONU from the network of a telecommunications carrier, and therefore can control the bandwidth dynamically by adjusting the size and frequency of a packet or cell addressed to each ONU. On the other hand, in order to dynamically control the bandwidth of an upstream signal, there is required a function in which each ONU notifies a request bandwidth to the OLT and then the OLT allocates bandwidth to each ONU. This function is referred to as DBA (Dynamic Bandwidth Assignment). The DBA function enables not only an improvement in the upstream bandwidth utilization efficiency of the PON system, but also the low-delay transmission of audio and video signals sensitive to delay characteristics. In FIG. 1, DBA 300 is an instruction section for supporting the DBA function from the OLT.

Figure 6:
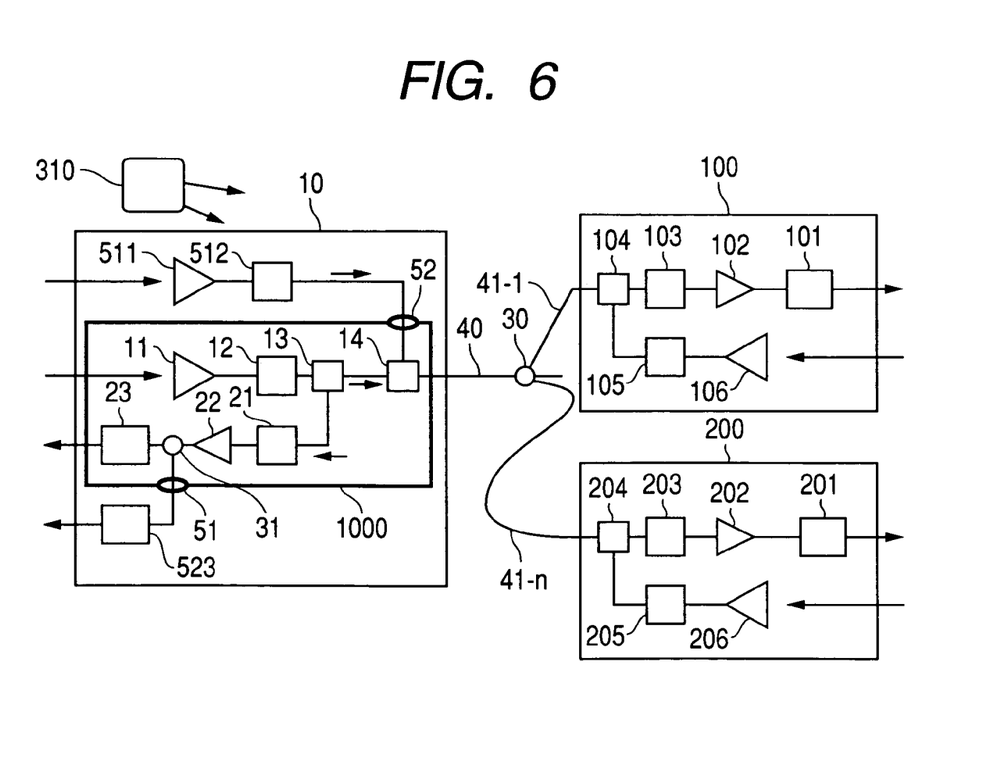
FIG. 6 is a diagram illustrating the basic configuration of a heterogeneous-PON coexistence system according to an embodiment of the invention.

An embodiment of the invention will be described in detail with reference to FIG. 6. A heterogeneous-PON coexistence system according to the invention is composed of an OLT transmitter-receiver 10, at least one first-group optical network terminating unit (ONU) transmitter-receiver 100, at least one second-group optical network terminating unit (ONU) transmitter-receiver 200, the optical fibers 40 and 41 and the optical splitter 30 for connecting these apparatuses. The OLT transmitter-receiver 10 is composed of driver amplifiers 11 and 511, modulation-capable light sources 12 and 512, WDMs 13 and 14, an optical receiver 21, a transimpedance amplifier 22, an electric signal branch section 31, clock and data recovery sections 23 and 523, output signal ports 51 and 52 for upgrade, and a DBA 310. The first-group ONU transmitter-receiver 100 is composed of a driver amplifier 106, a modulation-capable light source 105, a WDM 104, an optical receiver 103, a transimpedance amplifier 102, and a clock and data recovery section 101. The second-group ONU transmitter-receiver 200 is composed of a driver amplifier 206, a modulation-capable light source 205, a WDM 204, an optical receiver 203, a transimpedance amplifier 202, and a clock and data recovery section 201. Assume that the second-group ONU transmitter-receiver 200 deals with optical signals having a bit rate of 10 Gbps. In order to transmit an optical signal having a wavelength of 1490 nm or greater at this bit rate over a distance of 20 km, it is preferable that the modulation-capable light source 512 be a laser integrated with an EA modulator due to the above reason.

Signal processing will be described according to signal flows. First, a description will be made of a downstream signal from the OLT to the first-group ONU. A PON-frame-processed signal is processed by a SerDes circuit, and then inputted to the OLT transmitter-receiver 10. This electric signal is amplified by the driver amplifier 11, and the amplified signal allows the modulation-capable light source 12 to output a modulated signal beam. In G-PON and GE-PON, a 1.49 μm wavelength band is used for the modulated signal beam, which is passed through the WDMs 13 and 14 and then transmitted to the optical fiber 40. This optical signal is passed through the optical fiber 40, the optical splitter 30, and the optical fiber 41, and inputted to the first-group ONU transmitter-receiver 100. In the ONU transmitter-receiver 100, after the 1.49 μm wavelength band component is separated by the WDM 104, the signal beam is inputted to the optical receiver 103. A PIN-type PD or an APD is used as the optical receiver 103. The signal outputted from the photodiode is converted, amplified, and outputted by the transimpedance amplifier 102. From the output signal, a clock signal and a data signal are extracted and outputted by the clock and data recovery section 101. The signal thus outputted from the first-group ONU transmitter-receiver 100 is processed by a SerDes circuit, and is then PON-frame-processed.

Subsequently, a description will be made of a downstream signal from the OLT to the second-group ONU. A PON-frame-processed signal is processed by a SerDes circuit, and then inputted to the OLT transmitter-receiver 10. This electric signal is amplified by the driver amplifier 511, and the amplified signal allows the modulation-capable light source 512 to output a modulated signal beam. It is preferable that this signal beam have a wavelength not less than 1570 nm. The signal beam is multiplexed with a 1.49 μm band signal beam outputted from the modulation-capable light source 12 by the WDM 14, and the multiplexed signal is transmitted to the optical fiber 40. This optical signal is passed through the optical fiber 40, the optical splitter 30, and the optical fiber 41, and inputted to the second-group ONU transmitter-receiver 200. In the ONU transmitter-receiver 200, after the wavelength component not less than 1570 nm is separated by the WDM 204, the signal beam is inputted to the optical receiver 203. A PIN-type PD or an APD is used as the optical receiver 203. The signal outputted from the photodiode is converted, amplified, and outputted by the transimpedance amplifier 202. From the output signal, a clock signal and a data signal are extracted and outputted by the clock and data recovery section 201. The signal thus outputted from the second-group ONU transmitter-receiver 200 is processed by a SerDes circuit, and is then PON-frame-processed.

Next, a description will be made of an upstream signal from the first-group ONU transmitter-receiver 100 to the OLT. A PON-frame-processed signal is processed by the SerDes circuit, and then inputted to the first-group ONU transmitter-receiver 100. This electric signal is amplified by the driver amplifier 106, and modulated by the modulation-capable light source 105. A 1.3 μm wavelength band is used for the modulated signal beam, which is passed through the WDM 104 and then transmitted to the optical fiber 41. This optical signal is passed through the optical fiber 41, the optical splitter 30, and the optical fiber 40, and inputted to the OLT transmitter-receiver 10. In the OLT transmitter-receiver 10, after the 1.3 μm wavelength band component is separated by the WDMs 14 and 13, the signal beam is inputted to the optical receiver 21. A PIN-type PD or an APD is used as the optical receiver 21. The electric signal outputted from the photodiode is converted, amplified, and outputted by the transimpedance amplifier 22. From the output signal, a clock signal and a data signal are extracted and outputted by the clock and data recovery section 23. The signal outputted from the first-group ONU transmitter-receiver 100 through the OLT transmitter-receiver 10 is processed by the SerDes circuit, and is then PON-frame-processed.

Subsequently, a description will be made of an upstream signal from the second-group ONU transmitter-receiver 200 to the OLT. A PON-frame-processed signal is processed by the SerDes circuit, and then inputted to the second-group ONU transmitter-receiver 200. This electric signal is amplified by the driver amplifier 206, and modulated by the modulation-capable light source 205. A 1.3 μm wavelength band is used for the modulated signal beam, which is passed through the WDM 204 and then transmitted to the optical fiber 41. This optical signal is passed through the optical fiber 41, the optical splitter 30, and the optical fiber 40, and inputted to the OLT transmitter-receiver 10. Even though the modulation-capable light source 205 deals with signals having a bit rate of 10 Gbps, the modulation-capable light source 205 can be achieved by the method of directly modulating a laser due to the use of a wavelength band having a small amount of fiber dispersion. In the OLT transmitter-receiver 10, after the 1.3 μm wavelength band component is separated by the WDMs 14 and 13, the signal beam is inputted to the optical receiver 21. A PIN-type PD or an APD is used as the optical receiver 21. The electric signal outputted from the photodiode is converted, amplified, and outputted by the transimpedance amplifier 22. The output signal is branched by the electric signal branch section 31. From the branched signal, a clock signal and a data signal are extracted and outputted by the clock and data recovery section 523. The signal outputted from the second-group ONU transmitter-receiver 200 through the OLT transmitter-receiver 10 is processed by the SerDes circuit, and is then PON-frame-processed. It is preferable that the package configuration be divided by a heavy-line frame in FIG. 6. With this configuration, in the case of a system without the second-group ONU transmitter-receiver 200, the PON system can be constructed by having only the functions within the heavy-line frame in FIG. 6, that is, an upgrade-function-equipped basic OLT package 1000. When the second-group ONU transmitter-receiver 200 is needed, the functions outside the heavy-line frame in FIG. 6 are added through the output signal ports 51 and 52 for upgrade, thereby making it possible to support the second-group PON system as well. Thus, it is possible to reduce initial investment in the heterogeneous-PON coexistence system and provide a mechanism for extracting an upstream signal from the first-group and second-group ONUs. However, since the first-group and second-group ONUs have the same transmission wavelength, the OLT specifies, with the above-described collision avoidance and DBA, transmission timing to receive a signal. With this configuration, in the case where the OLT receives a transmission signal from the first-group and second-group ONUs, there is no factor for increasing a transmission line loss by adding an optical splitter to the existing PON system. Therefore, a large loss budget required in the PON system can be ensured without adding an optical amplifier or the like, thus enabling low-cost and excellent-quality transmission.

Figure 7:
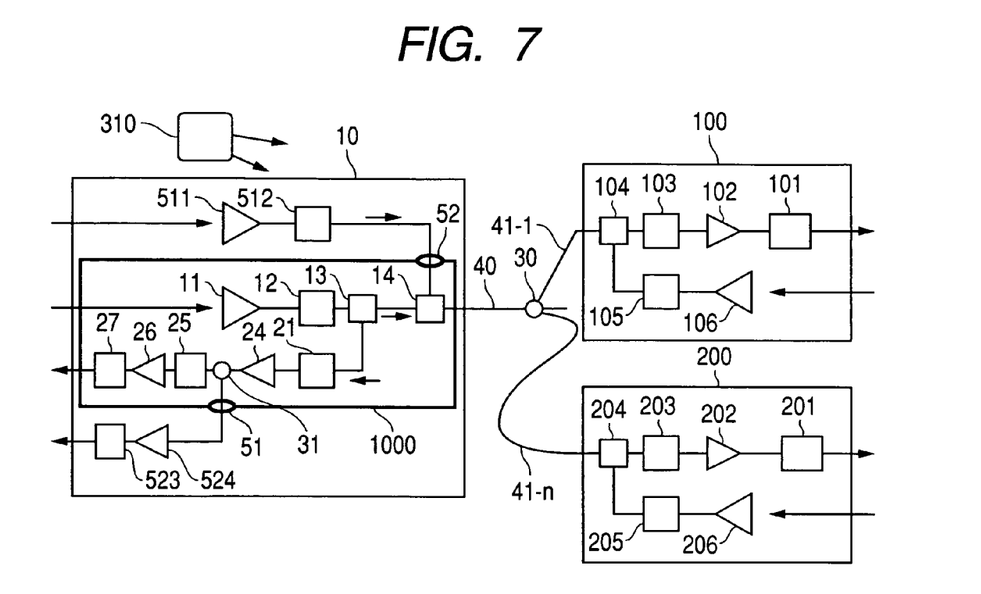
FIG. 7 is a diagram illustrating the second configuration of the heterogeneous-PON coexistence system.

An embodiment of the invention will be described in greater detail with reference to FIG. 7. A heterogeneous-PON coexistence system according to the invention is composed of an OLT transmitter-receiver 10, at least one first-group optical network terminating unit (ONU) transmitter-receiver 100, at least one second-group optical network terminating unit (ONU) transmitter-receiver 200, the optical fibers 40 and 41 and the optical splitter 30 for connecting these apparatuses. The difference between FIG. 6 and FIG. 7 is that the receiver of the OLT transmitter-receiver 10 is configured so as to improve its performance. In the OLT transmitter-receiver 10, compared to the transmitter-receiver shown in FIG. 6, the transimpedance amplifier 22 is replaced by a wideband transimpedance amplifier 24, which amplifies both low-speed signals and high-speed signals. It is difficult for an ordinary transimpedance amplifier to achieve both wideband and gain. Accordingly, a preference for the amplification of signals of 10 Gbps reduces the output of signals of 2.5 Gbps or less. Further, the noise component increases with increase in amplified bandwidth, which degrades the S/N ratios of signals of 2.5 Gbps or less. For this reason, in signal processing by the low-speed side (first-group) PON system, only the necessary bandwidth of a signal branched by the electric signal branch section 31 is passed through a bandpass filter 25 for the elimination of the noise component. In compensation for signal component reduction, the filtered signal is amplified by an electric-signal amplifier 26 in the subsequent stage. Further, a clock signal and a data signal are extracted by a clock and data recovery section 27, and then PON-frame-processed. In signal processing by the high-speed side (second-group) PON system as well, an electric-signal amplifier 524 in the subsequent stage may be provided to improve the S/N ratio. With this configuration, it is possible to achieve a heterogeneous-PON coexistence system of excellent transmission quality in consideration of part characteristics due to different bit rates.

In the above embodiments, the description has been made assuming that the first-group optical network terminating unit is the G-PON system and the second-group optical network terminating unit is the 10G-PON system. However, these units may be a combination of other PON systems. For example, the invention can also be applied to the case where the first-group optical network terminating unit is the GE-PON system and the second-group optical network terminating unit is the 10G-PON system, or the case where the first-group optical network terminating unit is the GE-PON system and the second-group optical network terminating unit is the G-PON system. Since the GE-PON system and the G-PON system have the same downstream wavelength, the WDM 104 is replaced by an optical splitter.

As described above, the invention provides an optical access communication apparatus and an optical communication system for constructing a simple and low-cost triple-play service system of excellent transmission quality.

What is claimed is:

1. An optical line terminating apparatus which is star-connected to a first optical network terminating unit and a second optical network terminating unit through an optical fiber and a splitter, the optical line terminating apparatus comprising:
   a fixed wavelength band optical receiver;
   an electric signal amplifier;
   an electric signal branch section; and
   a first clock and data recovery section,
   wherein the fixed wavelength band optical receiver receives optical signals having a same wavelength and mutually different bit rates from the first and second optical network terminating units and converts the optical signals into electric signals,
   wherein the electric signal amplifier amplifies the electric signals,
   wherein the electric signal branch section branches the amplified electric signals, and
   wherein the first clock and data recovery section extracts a first data signal and a first clock signal corresponding to a bit rate of the signal of the first optical network terminating unit from the branched signal.

2. The optical line terminating apparatus according to claim 1, further comprising a second clock and data recovery section,
   wherein the second clock and data recovery section extracts a second data signal and a second clock signal corresponding to a bit rate of the signal of the second optical network terminating unit from the branched signal of the second optical network terminating unit.

3. The optical line terminating apparatus according to claim 1, wherein the electric signal amplifier includes a transimpedance amplifier.

4. The optical line terminating apparatus according to claim 1, wherein the fixed wavelength band optical receiver is a 1.3 μm wavelength band optical receiver.

5. The optical line terminating apparatus according to claim 4, wherein the 1.3 μm wavelength band ranges from 1260 nm to 1360 nm.

6. The optical line terminating apparatus according to claim 1,
   wherein the first optical network terminating unit is an ONU (Optical Network Unit) in a G-PON system defined in ITU-T Recommendation G.984, and
   wherein the second optical network terminating unit is an apparatus that communicates at a bit rate higher than that of the ONU.

7. The optical line terminating apparatus according to claim 1,
   wherein the first optical network terminating unit is an ONU (Optical Network Unit) in a GE-PON defined in IEEE 802.3ah, and
   wherein the second optical network terminating unit is an apparatus that communicates at a bit rate higher than that of the ONU.

8. The optical line terminating apparatus according to claim 1,
   wherein the first optical network terminating unit is an ONU (Optical Network Unit) in a GE-PON defined in IEEE 802.3ah, and
   wherein the second optical network terminating unit is an ONU (Optical Network Unit) in a G-PON system defined in ITU-T Recommendation G.984.

9. An optical communication system comprising:
   a first optical network terminating unit;
   a second optical network terminating unit; and
   an optical line terminating apparatus which is connected to the first and second optical network terminating units through an optical fiber and a splitter;
   the optical line terminating apparatus including:
   a fixed wavelength band optical receiver;
   an electric signal amplifier;
   an electric signal branch section; and
   a first clock and data recovery section,
   wherein the fixed wavelength band optical receiver receives optical signals having a same wavelength and mutually different bit rates from the first and second optical network terminating units and converts the optical signals into electric signals,
wherein the electric signal amplifier amplifies the electric signals,
wherein the electric signal branch section branches the amplified electric signals, and
wherein the first clock and data recovery section extracts a first data signal and a first clock signal corresponding to a bit rate of the signal of the first optical network terminating unit from the branched signal.

10. The optical communication system according to claim 9, the optical line terminating apparatus further including a second clock and data recovery section,
wherein the second clock and data recovery section extracts a second data signal and a second clock signal corresponding to a bit rate of the signal of the second optical network terminating unit from the branched signal of the second optical network terminating unit.

11. The optical communication system according to claim 9, wherein the electric signal amplifier includes a transimpedance amplifier.

12. The optical communication system according to claim 9, wherein the fixed wavelength band optical receiver is a 1.3 µm wavelength band optical receiver.

13. The optical communication system according to claim 12, wherein the 1.3 µm wavelength band ranges from 1260 nm to 1360 nm.

14. The optical communication system according to claim 9,
wherein the first optical network terminating unit is an ONU (Optical Network Unit) in a G-PON system defined in ITU-T Recommendation G.984, and
herein the second optical network terminating unit is an apparatus that communicates at a bit rate higher than that of the ONU.

15. The optical communication system according to claim 9,
wherein the first optical network terminating unit is an ONU (Optical Network Unit) in a GE-PON defined in IEEE 802.3ah, and
wherein the second optical network terminating unit is an apparatus that communicates at a bit rate higher than that of the ONU.

16. The optical communication system according to claim 9,
wherein the first optical network terminating unit is an ONU (Optical Network Unit) in a GE-PON defined in IEEE 802.3ah, and
wherein the second optical network terminating unit is an ONU (Optical Network Unit) in a G-PON system defined in ITU-T Recommendation G.984.

* * * * *